(12) United States Patent
Chai

(10) Patent No.: US 12,482,504 B2
(45) Date of Patent: Nov. 25, 2025

(54) PAGE BUFFER CIRCUIT AND OPERATION METHOD THEREOF

(71) Applicant: SK hynix Inc., Icheon-si (KR)

(72) Inventor: Soo Yeol Chai, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 332 days.

(21) Appl. No.: 17/973,988

(22) Filed: Oct. 26, 2022

(65) Prior Publication Data
US 2023/0298637 A1 Sep. 21, 2023

(30) Foreign Application Priority Data

Mar. 21, 2022 (KR) .......................... 10-2022-0034787

(51) Int. Cl.
*G11C 7/10* (2006.01)
*G11C 7/12* (2006.01)

(52) U.S. Cl.
CPC .......... *G11C 7/1039* (2013.01); *G11C 7/1069* (2013.01); *G11C 7/12* (2013.01)

(58) Field of Classification Search
CPC ....... G11C 7/1039; G11C 7/1069; G11C 7/12; G11C 16/0483; G11C 2211/5642; G11C 7/067; G11C 7/08; G11C 7/106; G11C 11/5642; G11C 7/065; G11C 16/26; G11C 2207/2281; G11C 16/10; G11C 16/24; G11C 16/3422

USPC .................................................... 365/189.05
See application file for complete search history.

(56) References Cited

U.S. PATENT DOCUMENTS

| | | | |
|---|---|---|---|
| 11,195,586 B2 | 12/2021 | Kim et al. | |
| 2018/0096718 A1* | 4/2018 | Kim | ....................... G11C 5/145 |
| 2021/0407597 A1* | 12/2021 | Park | ................... G11C 16/0483 |
| 2022/0068399 A1* | 3/2022 | Cho | ........................ G11C 16/24 |

FOREIGN PATENT DOCUMENTS

| | | |
|---|---|---|
| KR | 1020060014502 A | 2/2006 |
| KR | 101046805 B1 | 7/2011 |
| KR | 1020110078751 A | 7/2011 |
| KR | 1020180036880 A | 4/2018 |
| KR | 101903932 B1 | 10/2018 |
| KR | 1020190006840 A | 1/2019 |
| KR | 1020190036285 A | 4/2019 |
| KR | 1020220000251 A | 1/2022 |
| KR | 1020220027550 A | 3/2022 |

* cited by examiner

*Primary Examiner* — Alexander Sofocleous
*Assistant Examiner* — James S Wells
(74) *Attorney, Agent, or Firm* — WILLIAM PARK AND ASSOCIATES LTD.

(57) ABSTRACT

A page buffer circuit may include: a data transfer circuit configured to transfer data, transferred to a first sensing node through a bit line, to a second sensing node during a data sensing operation; a first latch circuit configured to sense the data transferred to the first sensing node, and store the sensed data; and a second latch circuit configured to sense the data transferred to the second sensing node, and store the sensed data.

18 Claims, 8 Drawing Sheets

PAGE BUFFER CIRCUIT AND OPERATION METHOD THEREOF

CROSS-REFERENCES TO RELATED APPLICATION

The present application claims priority under 35 U.S.C. § 119 (a) to Korean application number 10-2022-0034787, filed on Mar. 21, 2022, which is incorporated herein by reference in its entirety.

BACKGROUND

1. Technical Field

Various embodiments generally relate to a page buffer circuit and an operation method thereof, and more particularly, to a page buffer circuit capable of performing a data sensing operation on data programmed in a memory cell, and an operation method thereof.

2. Related Art

A semiconductor memory apparatus may be classified as a volatile memory device or a non-volatile memory device. The memory device may receive power and perform a data processing operation of storing or outputting data. A volatile memory device has a high data processing operation speed, but needs to continuously receive power in order to retain stored data. A non-volatile memory device does not need to continuously receive power in order to retain stored data stored, however, it has a low data processing speed.

Recent development in process and design technology for semiconductor memory apparatuses has reduced the difference in data processing speed between the volatile memory device and the non-volatile memory device. Therefore, much attention has recently been paid to non-volatile memory devices which are relatively free from power requirements for retaining stored data.

A representative example of a nonvolatile memory device is a NAND-type flash memory device having a string structure in which a plurality of memory cells are coupled in series. The memory cells of the NAND-type flash memory device each include a floating gate. Therefore, the memory cells may store logic 'high' data or logic 'low' data by injecting or emitting electrons into or from the floating gate through the Fowler-Nordheim tunneling method.

A non-volatile memory device including a NAND-type flash memory device performs a program operation to store data in a memory cell, and performs a read operation to output data stored in a memory cell. Furthermore, the non-volatile memory device performs an erase operation to erase data stored in a memory cell before the program operation is performed. The non-volatile memory device also performs a verify operation of verifying whether desired data is programmed in a memory cell. The read operation and the verify operation include a data sensing operation for sensing the data programmed in the memory cell.

SUMMARY

In an embodiment in accordance with the present disclosure, a page buffer circuit may include a data transfer circuit configured to transfer data, received through a bit line, to a first sensing node and to a second sensing node during a data sensing operation. The page buffer circuit may also include a first latch circuit configured to sense the data transferred to the first sensing node, and store the sensed data transferred to the first sensing node. The page buffer circuit may further include a second latch circuit configured to sense the data transferred to the second sensing node, and store the sensed data transferred to the second sensing node.

An operation method of a page buffer circuit in accordance with the present disclosure may include evaluating a plurality of sensing nodes on the basis of data transferred during a data sensing operation. The method may also include sensing the plurality of sensing nodes, and storing the sensing results. The method may further include reading the results of sensing the plurality of nodes and storing the sensing results.

DETAILED DESCRIPTION

The description of the present disclosure is an embodiment for a structural and/or functional description. The scope of rights of the present disclosure should not be construed as being limited to embodiments described in the specification. That is, the scope of rights of the present disclosure should be understood as including equivalents, which may realize the technical spirit, because an embodiment may be modified in various ways and may have various forms. Furthermore, objects or effects proposed in the present disclosure do not mean that a specific embodiment should include all objects or effects or include only such effects. Accordingly, the scope of rights of the present disclosure should not be understood as being limited thereby.

The meaning of the terms that are described in this application should be understood as follows.

The terms, such as the "first" and the "second," are used to distinguish one element from another element, and the scope of the present disclosure should not be limited by the terms. For example, a first element may be named a second element. Likewise, the second element may be named the first element.

An expression of the singular number should be understood as including plural expressions, unless clearly expressed otherwise in the context. The terms, such as "include" or "have," should be understood as indicating the existence of a set characteristic, number, step, operation, element, part, or a combination thereof, not excluding a possibility of the existence or addition of one or more other characteristics, numbers, steps, operations, elements, parts, or a combination thereof.

In each of the steps, symbols (e.g., a, b, and c) are used for convenience of description, and the symbols do not describe an order of the steps. The steps may be performed in an order different from the order described in the context unless a specific order is clearly described in the context. That is, the steps may be performed according to a described order, may be performed substantially at the same time as the described order, or may be performed in reverse order of the described order.

All the terms used herein, including technological or scientific terms, have the same meanings as those that are typically understood by those skilled in the art, unless otherwise defined. Terms defined in commonly used dictionaries should be construed as with the same meanings as those in the context in related technology and should not be construed as with ideal or excessively formal meanings, unless clearly defined in the application.

Various embodiments are directed to a page buffer circuit capable of minimizing or reducing a data sensing operation on data programmed in a memory cell, and an operation method thereof.

In accordance with the present embodiments, it is possible to minimize or reduce the data sensing operation on data programmed in a memory cell, thereby minimizing or reducing a read and verify operation time.

Figure 1:
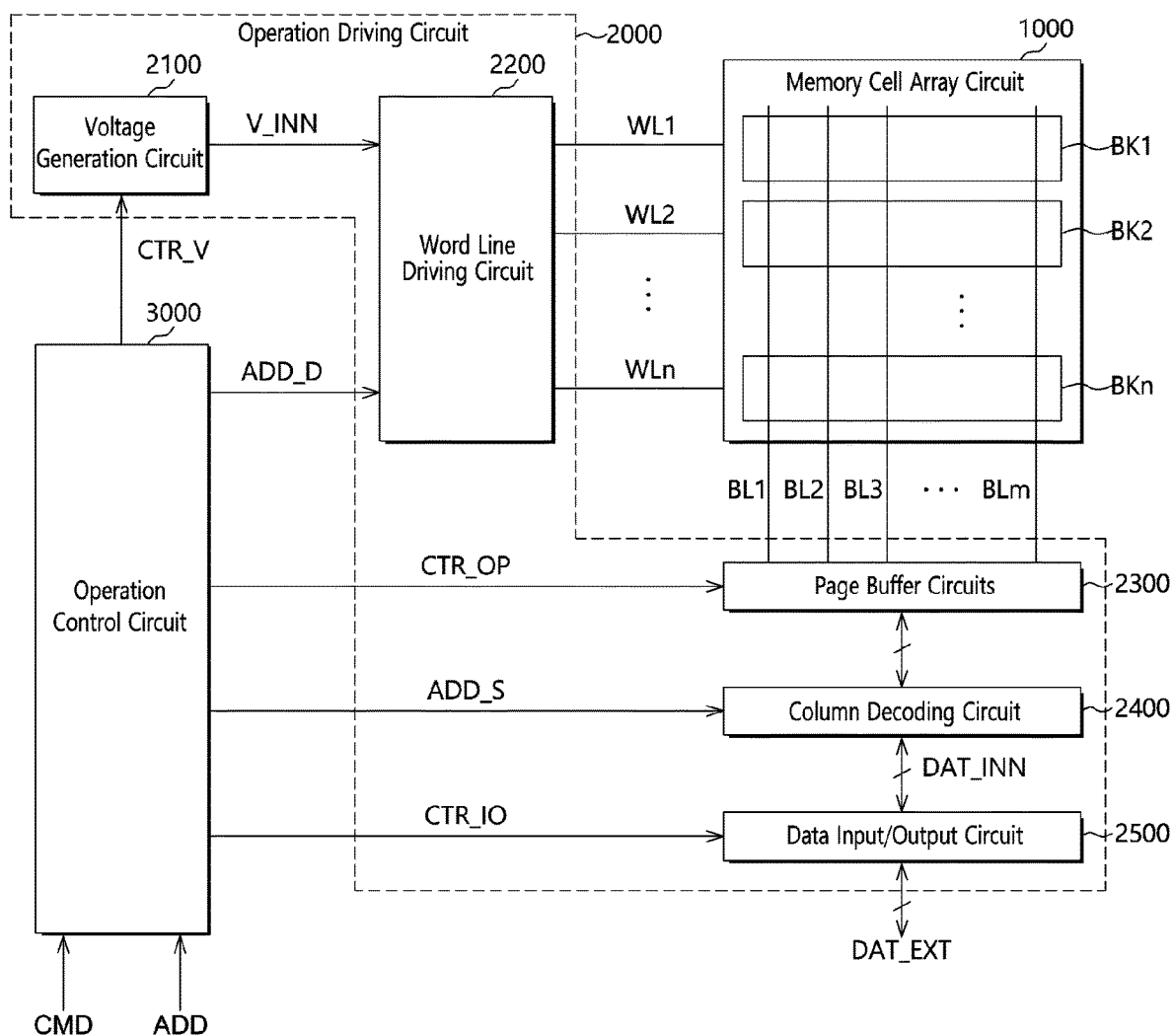
FIG. 1 is a block diagram illustrating a configuration of a semiconductor memory apparatus in accordance with an embodiment.

FIG. 1 is a block diagram illustrating a configuration of a semiconductor memory apparatus in accordance with an embodiment.

Referring to FIG. 1, the semiconductor memory apparatus may include a memory cell array circuit 1000, an operation driving circuit 2000, and an operation control circuit 3000.

The memory cell array circuit 1000 may be configured to store data. The memory cell array circuit 1000 may include a plurality of memory block circuits BK1 to Bkn, where n is a natural number. The plurality of memory block circuits BK1 to BKn may each include a plurality of memory cells for storing data. The plurality of memory cells may have a string structure in which the memory cells are coupled in series in a vertical direction of FIG. 1. The plurality of memory cells may be coupled to a plurality of word lines WL1 to WLn and a plurality of bit lines BL1 to BLn, respectively, and thus have a matrix structure, where m is a natural number. Although it will be described below, the plurality of word lines WL1 to WLn may be driven to a preset voltage according to a program operation, a read operation, an erase operation, or a verify operation by a word line driving circuit 2200. The plurality of bit lines BL1 to BLm may be driven to a preset voltage according to data stored in a memory cell or data to be stored in the memory cell.

The operation driving circuit 2000 may be driven to perform a program operation, a read operation, an erase operation, or a verify operation on the memory cell array circuit 1000. The operation driving circuit 2000 may include a voltage generation circuit 2100, the word line driving circuit 2200, a plurality of page buffer circuits 2300, a column decoding circuit 2400, and a data input/output circuit 2500. Hereafter, the components included in the operation driving circuit 2000 will be described in detail.

The voltage generation circuit 2100 may be configured to generate an internal voltage V_INN required for each of the program operation, the read operation, the erase operation, and the verify operation. The voltage generation circuit 2100 may generate the internal voltage V_INN having various voltage levels corresponding to the respective operations, on the basis of a voltage control signal CTR_V generated by the operation control circuit 3000.

The word line driving circuit 2200 may be configured to selectively drive the plurality of word lines WL1 to WLn to the internal voltage V_INN generated by the voltage generation circuit 2100. The word line driving circuit 2200 may receive the internal voltage V_INN from the voltage generation circuit 2100, and receive a driving address signal ADD_D from the operation control circuit 3000. The driving address signal ADD_D may be a signal for selectively enabling the corresponding word line among the plurality of word lines WL1 to WLn. Therefore, the word line driving circuit 2200 may selectively enable the plurality of word lines WL1 to WLn, and drive the enabled word line to the corresponding internal voltage V_INN, on the basis of the driving address signal ADD_D and the internal voltage V_INN.

Although not illustrated in the drawings, the word line driving circuit 2200 may also be coupled to a drain select line, a source select line, and a common source line, which are included in the memory cell array circuit 1000. Therefore, the word line driving circuit 2200 may drive the drain select line, the source select line, and the common source line to the preset internal voltage V_INN according to the program operation, the read operation, the erase operation, or the verify operation.

As described above, the plurality of memory cells may be coupled to the plurality of word lines WL1 to WLn, respectively. A word line coupled to a memory cell selected during the program operation, the read operation, the erase operation, or the verify operation may be driven by the corresponding internal voltage V_INN. Hereafter, for convenience of description, a memory cell selected during the program operation, the read operation, the erase operation, or the verify operation will be defined as a 'selected memory cell', and a word line coupled to the selected memory cell will be defined as a 'selected word line'. Furthermore, memory cells other than the selected memory cell will be defined as 'unselected memory cells', and word lines coupled to the unselected memory cells will be defined as 'unselected word lines'. In other words, a selected word line coupled to a selected memory cell during the program operation, the read operation, the erase operation, or the verify operation may be driven by the corresponding internal voltage V_INN.

For example, during the program operation, the word line driving circuit 2200 may apply a program voltage as one of the internal voltages V_INN to the selected word line among the plurality of word lines WL1 to WLn, and apply a program pass voltage to the other unselected word lines, the program pass voltage having a lower voltage level than the program voltage. Furthermore, during the read operation, the word line driving circuit 2200 may apply a read voltage to the selected word line, and apply a read pass voltage to the unselected word lines, the read pass voltage having a higher voltage level than the read voltage. Furthermore, during the erase operation, the word line driving circuit 2200 may apply a ground voltage to the selected word line. Furthermore, during the verify operation, the word line driving circuit 2200 may apply a verify voltage as one of the internal voltages V_INN to the selected word line, and apply a verify pass voltage to the unselected word lines, the verify pass voltage having a higher voltage level than the verify voltage.

The plurality of page buffer circuits 2300 may be coupled to the memory cell array circuit 1000 through the plurality of bit lines BL1 to BLm. The plurality of page buffer circuit 2300 may be configured to transfer data to the plurality of bit lines BL1 to BLm during the program operation. Furthermore, the plurality of page buffer circuits 2300 may be configured to receive data from the plurality of bit lines BL1 to BLm during the read operation and the verify operation. The plurality of page buffer circuits 2300 may be configured as a plurality of latch circuits, respectively. The plurality of latch circuits may each perform a circuit operation based on the program operation, the read operation, or the verify operation on data which are inputted/outputted on the basis of an operation control signal CTR_OP generated by the operation control circuit 3000.

The number of the plurality of latch circuits may be changed depending to design. In particular, the number of the plurality of latch circuits may be changed depending on the number of data distributions stored in a memory cell. In this connection, memory cells of a non-volatile memory device are defined as single-level cells, multi-level cells, triple-level cells, or quadruple-level cells, depending on the number of data distributions stored in one memory cell during the program operation. The single-level cell may store one of two logical data states corresponding to one bit. The logic 'high' data state and the logic 'low' data, which have been described above, may represent the two logical data states. The multi-level cell may store four logical data states corresponding to two bits, the triple-level cell may store eight logical data states corresponding to three bits, and the quadruple-level cell may store 16 logical data states corresponding to four bits. Therefore, the number of the plurality of latch circuits may correspond to the number of data distributions stored in a memory cell.

The column decoding circuit 2400 may be configured to control a transfer path of input/output data. The column decoding circuit 2400 may receive, from the plurality of page buffer circuits 2300, data to be outputted to the outside of the semiconductor memory apparatus, and receive, from the data input/output circuit 2500, data to be inputted to the inside of the semiconductor memory apparatus. Furthermore, the column decoding circuit 2400 may receive a select address signal ADD_S from the operation control circuit 3000, and control the transfer path of input/output data. The select address signal ADD_S may be a signal for selecting the corresponding bit line among the plurality of bit lines BL1 to BLm.

The data input/output circuit 2500 may be configured to control input/output of an internal data signal DAT_INN and an external data signal DAT_EXT. The internal data signal DAT_INN may include data inputted to/outputted from the inside of the semiconductor memory device. The external data signal DAT_EXT may include data inputted to/outputted from the outside of the semiconductor memory device. The data input/output circuit 2500 may perform a data input/output operation on the basis of an input/output control signal CTR_IO generated by the operation control circuit 3000. The data input/output circuit 2500 may output, as the internal data DAT_INN, the external data DAT_EXT inputted through a host device or a control device, for example, during the program operation, on the basis of the input/output control signal CTR_IO. Furthermore, the data input/output circuit 2500 may output, as the external data DAT_EXT, the internal data DAT_INN inputted from the column decoding circuit 2400 during the read operation, on the basis of the input/output control signal CTR_IO.

The operation control circuit 3000 may be configured to control the voltage generation circuit 2100, the word line driving circuit 2200, the plurality of page buffer circuits 2300, the column decoding circuit 2400, and the data input/output circuit 2500, which are included in the operation driving circuit 2000. The operation control circuit 3000 may generate the voltage control signal CTR_V for controlling the voltage generation circuit 2100 on the basis of a command signal CMD and an address signal ADD which are inputted through the host device or the control device, for example. Furthermore, the operation control circuit 3000 may generate the driving address signal ADD_D for controlling the word line driving circuit 2200, the operation control signal CTR_OP for controlling the plurality of page buffer circuits 2300, the select address signal ADD_S for controlling the column decoding circuit 2400, and the input/output control signal CTR_IO for controlling the data input/output circuit 2500. Therefore, the operation control circuit 3000 may generate various signals to control overall operations of the semiconductor memory apparatus.

Figure 2:
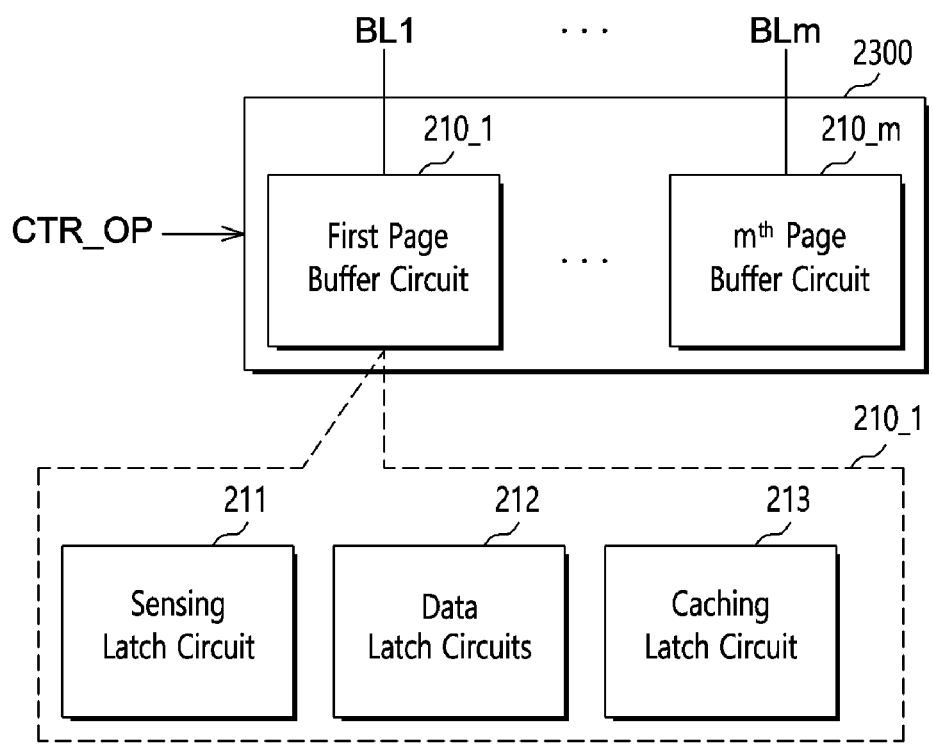
FIG. 2 is a block diagram illustrating internal configurations of a plurality of page buffer circuits in FIG. 1.

FIG. 2 is a block diagram illustrating internal configurations of the plurality of page buffer circuits 2300 of FIG. 1.

Referring to FIGS. 1 and 2, the plurality of page buffer circuits 2300 may be configured to store data which are inputted/outputted according to the program operation, the read operation, and the verify operation, on the basis of the operation control signal CTR_OP. The plurality of page buffer circuits 2300 may include first to $m^{th}$ page buffer circuits 210_1 to 210_$m$ coupled to the plurality of bit lines BL1 to BLm, respectively. Hereafter, for convenience of description, the first page buffer circuit 210_1 coupled to a first bit line BL1, among the first to $m^{th}$ page buffer circuits 210_1 to 210_$m$, will be representatively described.

The first page buffer circuit 210_1 may be coupled to the first bit line BL1, and configured to store data inputted to/outputted from the first bit line BL1 during the program operation, the read operation, and the verify operation. The first page buffer circuit 210_1 may include a sensing latch circuit 211, a plurality of data latch circuits 212, and a caching latch circuit 213.

The sensing latch circuit 211 may be configured to receive data stored in a memory cell and sense the received data, during the read operation. The sensing latch circuit 211 may retain data stored therein or invert the data and store the inverted data, depending on the data transferred through the first bit line BL1, during the read operation.

The plurality of data latch circuits 212 may be configured to store data during the program operation and the read operation. The number of the plurality of data latch circuits 212 may correspond to the number of data distributions stored in a memory cell. In addition, the plurality of data latch circuits 212 may be used for various purposes. For example, the plurality of data latch circuits 212 may include a verify data latch circuit for storing verify data based on the verify operation.

For reference, FIG. 2 separately illustrates the sensing latch circuit 211 and the plurality of data latch circuits 212. However, the sensing latch circuit 211 and the plurality of data latch circuits 212 are only distinguished from each other according to the representative use, and the general circuit configurations thereof are the same as each other. Although described below in more detail, the first page buffer circuit 210_1 in accordance with the present embodiment may include at least two latch circuits among the sensing latch circuit 211 and the plurality of data latch circuits 212. The two latch circuits may have different circuit configurations.

The caching latch circuit 213 may be configured to receive data stored in the plurality of data latch circuits 212 and output the received data as final data, during the read operation. The caching latch circuit 213 may transfer the stored final data to the column decoding circuit 2400 (see FIG. 1). The caching latch circuit 213 may be configured to store data inputted to the first page buffer circuit 210_1 during the program operation.

Figure 3:
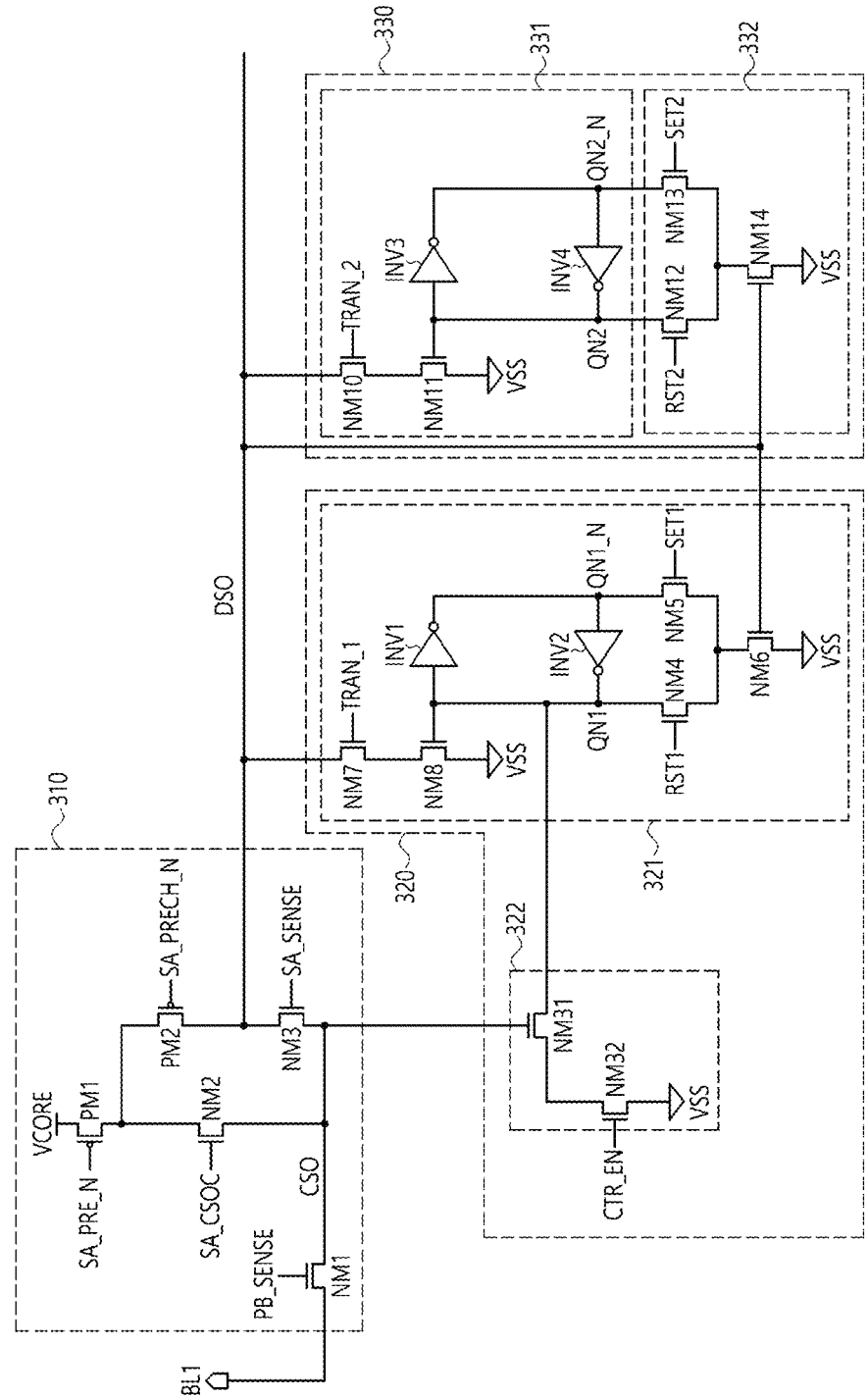
FIG. 3 is a circuit diagram schematically illustrating some components of a first page buffer circuit of FIG. 2.

FIG. 3 is a circuit diagram schematically illustrating some components of the first page buffer circuit 210_1 of FIG. 2. For convenience of description, FIG. 3 representatively illustrates two latch circuits among the sensing latch circuit 211 and the plurality of data latch circuits 212 in FIG. 2. For reference, one latch circuit of the two latch circuits may be configured as the caching latch circuit 213. In the following descriptions, the two latch circuits will be defined as a first latch circuit 320 and a second latch circuit 330.

Before description, the first page buffer circuit 210_1 may be controlled on the basis of the operation control signal CTR_OP generated by the operation control circuit 3000 of FIG. 1. In other words, various control signals for controlling the first page buffer circuit 210_1 may be included in the operation control signal CTR_OP. The various control signals will be described below. The read operation and the verify operation may include a data sensing operation. The data sensing operation may include a series of operations for sensing data transferred through the first bit line BL1 and storing the sensed data.

Referring to FIG. 3, the first page buffer circuit 210_1 may include a data transfer circuit 310, the first latch circuit 320, and the second latch circuit 330.

The data transfer circuit 310 may be configured to transfer data, transferred to a common sensing node CSO through the first bit line BL1, to a data sensing node DSO during the data sensing operation. The common sensing node CSO may have a voltage level corresponding to the state of data programmed in a selected memory cell during the data sensing operation. Like the common sensing node CSO, the data sensing node DSO may have a voltage level corresponding to the state of data programmed in a selected memory cell during the data sensing operation. In other words, the data transfer circuit 310 may transfer the data, programmed in the selected memory cell, to the common sensing node CSO and the data sensing node DSO. The data transfer circuit 310 may include first to third NMOS transistors NM1, NM2, and NM3 and first and second PMOS transistors PM1 and PM2.

The first NMOS transistor NM1 may be coupled between the first bit line BL1 and the common sensing node CSO. The first NMOS transistor NM1 may have a gate terminal configured to receive a buffer sensing control signal PB_SENSE. The second NMOS transistor NM2 may be coupled between the first PMOS transistor PM1 and the common sensing node CSO. The second NMOS transistor NM2 may have a gate terminal configured to receive a current control signal SA_CSOC. The third NMOS transistor NM3 may be coupled between the common sensing node CSO and the data sensing node DSO. The third NMOS transistor NM3 may have a gate terminal configured to receive a transfer control signal SA_SENSE. The first and second PMOS transistors PM1 and PM2 may be coupled in series between a power supply voltage terminal VCORE and the data sensing node DSO. The first PMOS transistor PM1 may have a gate terminal configured to receive a first precharge signal SA_PRE_N, and the second PMOS transistor PM2 may have a gate terminal configured to receive a second precharge signal SA_PRECH_N.

Hereafter, a simple circuit operation for the data sensing operation of the data transfer circuit 310 will be described.

For reference, the data sensing operation may include a precharging operation, an evaluation operation, and a data latching operation.

During the precharging operation, the first and second PMOS transistors PM1 and PM2 may be turned on. Therefore, the data sensing node DSO may be precharged with a voltage level applied to the power supply voltage terminal VCORE. The third NMOS transistor NM3 may also be turned on. At this time, the common sensing node CSO may be precharged with a lower voltage level than the data sensing node DSO. When the voltage level of the transfer control signal SA_SENSE is equal to the voltage level applied to the power supply voltage terminal VCORE, the common sensing node CSO may be precharged with a voltage level lower by the threshold voltage of the third NMOS transistor NM3 than the voltage level applied to the power supply voltage terminal VCORE.

During the evaluation operation, the second PMOS transistor PM2 may be turned off. Therefore, the voltage levels of the common sensing node CSO and the data sensing node DSO may be controlled according to the state of the data programmed in the selected memory cell. The selected memory cell may have a threshold voltage corresponding to the state of the data programmed therein. Therefore, when the threshold voltage of the selected memory cell is higher than the read voltage applied to the selected word line during the data sensing operation, no current flows through the first bit line BL1. Thus, the voltage levels of the common sensing node CSO and the data sensing node DSO may be retained as the precharge voltage level. On the contrary, when the threshold voltage of the selected memory cell is lower than the read voltage applied to the selected word line during the data sensing operation, a current may flow through the first bit line BL1. Therefore, the voltage levels of the common sensing node CSO and the data sensing node DSO may be lowered as much. In other words, the common sensing node CSO and the data sensing node DSO may have a voltage level corresponding to the state of the data programmed in the selected memory cell during the data sensing operation.

As a result, the data transfer circuit 310 may transfer the data, transferred through the first bit line BL1, to the data sensing node DSO through the common sensing node CSO during the data sensing operation. The data transferred in such a manner may be transferred to and stored in the first and second latch circuits 320 and 330, which will be described below, through the data latching operation.

Before the first and second latch circuits 320 and 330 are described, the voltage levels of the common sensing node CSO and the data sensing node DSO will be described with reference to FIG. 4.

Figure 4:
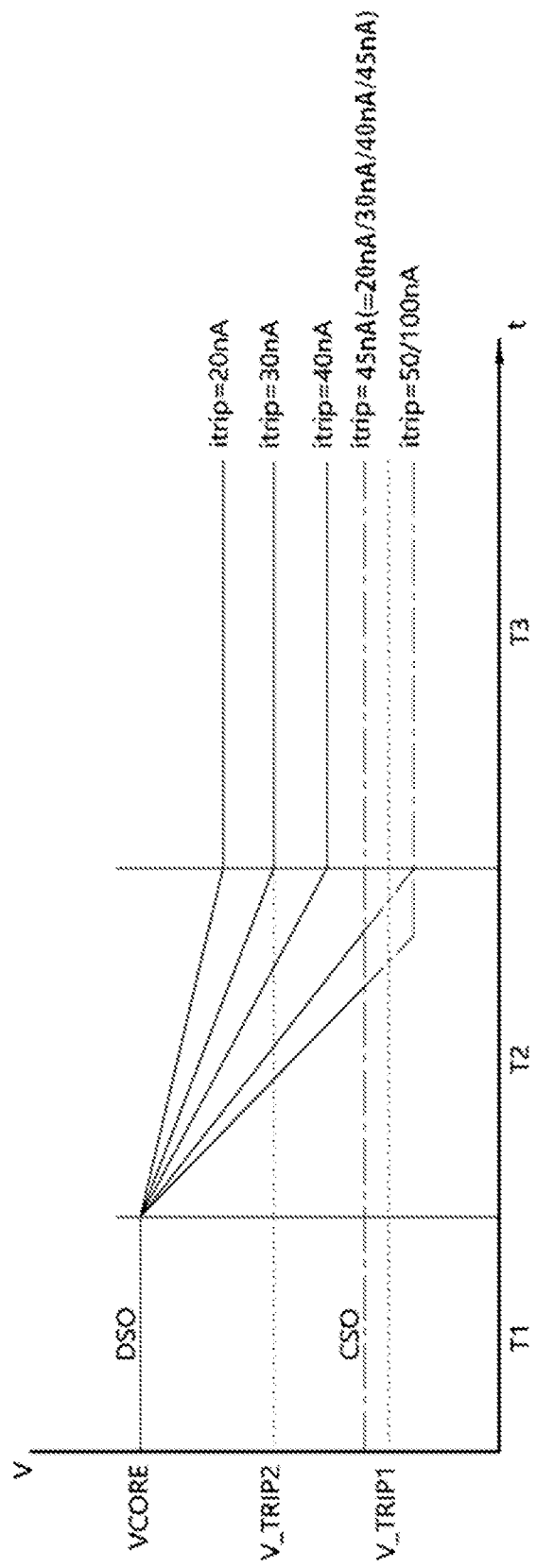
FIG. 4 is a graph illustrating the voltage levels of a common sensing node and a data sensing node in FIG. 3.

FIG. 4 is a graph illustrating the voltage levels of the common sensing node CSO and the data sensing node DSO in FIG. 3. In FIG. 4, a horizontal axis corresponds to time t, and a vertical axis corresponds to voltage V. As described above, a current may flow through the first bit line BL, depending on the state of data programmed in a selected memory cell. Hereafter, for convenience of description, the current flowing through the first bit line BL1 will be defined as a trip current itrip. In other words, the trip current itrip corresponding to 20 nA, 30 nA, 40 nA, 50 nA, or 100 nA, for example, may flow through the first bit line BL1, depending on the state of the data programmed in the selected memory cell.

First, the common sensing node CSO and the data sensing node DSO may be precharged in a precharging operation period T1. At this time, the data sensing node DSO may be precharged with a voltage level corresponding to the power supply voltage terminal VCORE. Furthermore, as the gate voltage and the threshold voltage of the third NMOS transistor NM3 are reflected into the common sensing node CSO, the common sensing node CSO may be precharged with a lower voltage level than the data sensing node DSO.

During an evaluation operation period T2, the voltage level of the data sensing node DSO may be lowered according to the trip current itrip. At this time, when the trip current itrip flowing through the first bit line BL1 is 50 nA or 100 nA, the voltage level of the data sensing node DSO may become lower than the voltage level with which the common sensing node CSO is precharged. In other words, when the trip current itrip is 50 nA or 100 nA, the voltage level of the data sensing node DSO may become lower than the voltage level of the common sensing node CSO precharged in the precharging operation period T1.

Therefore, the data transferred to the common sensing node CSO in a data latching operation period T3 may be sensed on the basis of a first trip voltage V_TRIP1 lower than a voltage associated with the trip current itrip of 40 nA and higher than a voltage associated with the trip current itrip of 50 nA. The first trip voltage V_TRIP1 may be associated with the trip current itrip of 45 nA, for example. Furthermore, the data transferred to the data sensing node DSO in the data latching operation period T3 may be sensed on the basis of a second trip voltage V_TRIP2 corresponding to the trip current itrip of 30 nA, for example. The second trip voltage V_TRIP2 may have a higher voltage level than the first trip voltage V_TRIP1. The first trip voltage V_TRIP1 and the second trip voltage V_TRIP2 will be described below again.

The first page buffer circuit 210_1 in accordance with the present embodiment may sense the data transferred to the common sensing node CSO, on the basis of the first trip voltage V_TRIP1, and sense the data transferred to the data sensing node DSO, on the basis of the second trip voltage V_TRIP2. In other words, the first page buffer circuit 210_1 may simultaneously perform the data sensing operations on the common sensing node CSO and the data sensing node DSO which are different sensing nodes. Therefore, the first page buffer circuit 210_1 may minimize or reduce the data sensing operation. Furthermore, the first page buffer circuit 210_1 may minimize or reduce the read and verify operation time through such a data sensing operation.

For reference, nowadays, at least two data sensing operations are performed in order to more accurately sense data programmed in a selected memory cell. In other words, in the related art, at least two precharging operations, at least two evaluation operations, and at least two data latch operations are performed. However, the first page buffer circuit 210_1 in accordance with the present embodiment may sense the first and second trip voltages V_TRIP1 and V_TRIP2, which are different trip voltages, through one data sensing operation. Therefore, the first page buffer circuit 210_1 may minimize or reduce the data sensing operation.

Referring back to FIG. 3, the first latch circuit 320 and the second latch circuit 330 will be described.

The first latch circuit 320 may be configured to sense data transferred to the common sensing node CSO and store the sensed data, during the data sensing operation. The first latch circuit 320 may sense the data transferred to the common sensing node CSO, on the basis of the above-described first trip voltage V_TRIP1.

However, the present embodiment is not limited thereto. The first trip voltage V_TRIP1 may be set through the design of the first latch circuit 320, in order to distinguish the voltage level of the common sensing node CSO. The first latch circuit 320 may include a latch driving circuit 321 and a current control circuit 322.

The latch driving circuit 321 may be configured to store the data transferred to the common sensing node CSO. The latch driving circuit 321 may include a first inverter INV1; a second inverter INV2; and fourth to eighth NMOS transistors NM4, NM5, NM6, NM7, and NM8.

The first inverter INV1 and the second inverter INV2 may be coupled in a latch configuration. In other words, an output terminal of the first inverter INV1 may be coupled to an input terminal of the second driving buffer BF2, and an output terminal of the second inverter INV2 may be coupled to an input terminal of the first inverter INV1. The input terminal of the first inverter INV1 is defined as a first primary data node QN1, and the output terminal of the first inverter INV1 is defined as a first secondary data node QN1_N.

Through such a configuration, the latch driving circuit 321 may store the data, transferred to the common sensing node CSO, in the first secondary/primary data nodes QN1_N and QN1 which are the respective output terminals of the first and second inverters INV1 and INV2. The configuration and operation for transferring the data, transferred to the common sensing node CSO, to the latch driving circuit 321 will be described below again in the following description for the current control circuit 322.

The fourth NMOS transistor NM4 may have drain and source terminals coupled between the first primary data node QN1 and the sixth NMOS transistor NM6. The fourth NMOS transistor NM4 may have a gate terminal configured to receive a first reset control signal RST1. The fifth NMOS transistor NM5 may have drain and source terminals coupled between the first secondary data node QN1_N and the sixth NMOS transistor NM6. The fifth NMOS transistor NM5 may have a gate terminal configured to receive a first set control signal SET1. The sixth NMOS transistor NM6 may have drain and source terminals coupled between a ground voltage terminal VSS and a common node between the fourth and fifth NMOS transistors NM4 and NM5. The sixth NMOS transistor NM6 may have a gate terminal coupled to the data sensing node DSO. The seventh and eighth NMOS transistors NM7 and NM8 may be coupled in series between the data sensing node DSO and the ground voltage terminal VSS. The seventh NMOS transistor NM7 may have a gate terminal configured to receive a first data transfer signal TRAN_1. The eighth NMOS transistor NM8 may have a gate terminal coupled to the first primary data node QN1.

Through such a configuration, the latch driving circuit 321 may perform a set operation on the latch driving circuit 321 on the basis of the first set control signal SET1, and perform a reset operation on the latch driving circuit 321 on the basis of the first reset control signal RST1. Furthermore, the latch driving circuit 321 may drive the data sensing node DSO according to the data stored in the first primary/secondary data nodes QN1 and QN1_N on the basis of the first data transfer signal TRAN_1, during, for example, a data migration operation other than the data sensing operation.

The current control circuit 322 may be configured to control a driving current of the latch driving circuit 321 on the basis of the data transferred to the common sensing node CSO. The current control circuit 322 may control the driving current of the latch driving circuit 321 on the basis of an enable control signal CTR_EN which is activated during the data sensing operation. The current control circuit 322 may include 31st and 32nd NMOS transistors NM31 and NM32.

The 31st NMOS transistor NM31 may have drain and source terminals coupled between the first primary data node QN1 and the 32nd NMOS transistor NM32. The 31st NMOS transistor NM31 may have a gate terminal coupled to the common sensing node CSO. In other words, the 31st NMOS transistor NM31 may have a gate terminal coupled to the common sensing node CSO, and one side coupled to the first primary data node QN1. The 32nd NMOS transistor NM32 may have drain and source terminals coupled between the 31st NMOS transistor NM31 and the ground voltage terminal VSS. The 32nd NMOS transistor NM32 may have a gate terminal configured to receive the enable control signal CTR_EN. In other words, the 32nd NMOS transistor NM32 may receive the enable control signal CTR_EN through the gate terminal thereof, and may be coupled between the other side of the 31st NMOS transistor NM31 and the ground voltage terminal VSS.

Although will be described again with reference to FIG. 5, the enable control signal CTR_EN may be a signal which is activated during the data sensing operation. Thus, when the enable control signal CTR_EN is activated after data is transferred to the common sensing node CSO, the first primary data node QN1 and the ground voltage terminal VSS may be electrically coupled to each other according to the voltage level of the common sensing node CSO. In other words, the driving current of the first primary data node QN1 may be controlled on the basis of the data applied to the common sensing node CSO. When the driving current is controlled, it may indicate that the voltage level of the first primary data node QN1 is also controlled.

Through such a configuration, the current control circuit 322 may control the driving current of the latch driving circuit 321 on the basis of the data transferred to the common sensing node CSO. Therefore, the latch driving circuit 321 may store the data transferred to the common sensing node CSO, on the basis of the driving current controlled by the current control circuit 322.

In short, the first latch circuit 320 including the latch driving circuit 321 and the current control circuit 322 may sense and store the data transferred to the common sensing node CSO, during the data sensing operation. More specifically, the first latch circuit 320 may sense the data transferred to the common sensing node CSO, on the basis of the first trip voltage V_TRIP1, and store the sensing result. The voltage level of the first trip voltage V_TRIP1 may be set according to the process design of the 31st and 32nd NMOS transistors NM31 and NM32 included in the current control circuit 322. Although not illustrated in the drawings, the voltage level of the first trip voltage V_TRIP1 may be variously and selectively set through additional various circuit configurations.

The second latch circuit 330 may be configured to sense data transferred to the data sensing node DSO and store the sensed data, during the data sensing operation. The second latch circuit 330 may sense the data transferred to the data sensing node DSO, on the basis of the above-described second trip voltage V_TRIP2. It has been described with reference to FIG. 4 that the second trip voltage V_TRIP2 may have a voltage level corresponding to the trip current itrip of 30 nA. However, the present embodiment is not limited thereto. The second trip voltage V_TRIP2 may be set through the design of the second latch circuit 330, in order to distinguish the voltage level of the data sensing node DSO. The second latch circuit 330 may include a latch driving circuit 331 and a current control circuit 332.

The latch driving circuit 331 may be configured to store the data transferred to the data sensing node DSO. The latch driving circuit 331 may include a third inverter INV3, a fourth inverter INV4, and tenth and 11th NMOS transistors NM10 and NM11.

The third inverter INV3 and the fourth inverter INV4 may be coupled in a latch configuration. In other words, an output terminal of the third inverter INV3 may be coupled to an input terminal of the fourth inverter INV4, and an output terminal of the fourth inverter INV4 may be coupled to an input terminal of the third inverter INV3. The input terminal of the third inverter INV3 is defined as a second primary data node QN2, and the output terminal of the third inverter INV3 is defined as a second secondary data node QN2_N.

Through such a configuration, the latch driving circuit 331 may store the data, transferred to the data sensing node DSO, in the second secondary/primary data nodes QN2_N and QN2 which are the respective output terminals of the third and fourth inverters INV3 and INV4. The configuration and operation for transferring the data, transferred to the data sensing node DSO, to the latch driving circuit 331 will be described below again in the following description for the current control circuit 332.

The tenth and 11th NMOS transistors NM10 and NM11 may be coupled in series between the data sensing node DSO and the ground voltage terminal VSS. The 10th NMOS transistor NM10 may have a gate terminal configured to receive a second data transfer signal TRAN_2. The 11th NMOS transistor NM11 may have a gate terminal coupled to the second primary data node QN2.

Thus, through such a configuration, the latch driving circuit 331 may drive the data sensing node DSO according to the data stored in the second primary/secondary data nodes QN2 and QN2_N on the basis of the second data transfer signal TRAN_2 during, for example, a data migration operation other than the data sensing operation.

The current control circuit 332 may be configured to control a driving current of the latch driving circuit 331 on the basis of the data transferred to the data sensing node DSO. The current control circuit 332 may include 12th to 14th NMOS transistors NM12, NM13, and NM14.

The 12th NMOS transistor NM12 may have drain and source terminals coupled between the second primary data node QN2 and the 14th NMOS transistor NM14. The 12th NMOS transistor NM12 may have a gate terminal configured to receive a second reset control signal RST2. The 13th NMOS transistor NM13 may have drain and source terminals coupled between the second secondary data node QN2_N and the 14th NMOS transistor NM14. The 13th NMOS transistor NM13 may have a gate terminal configured to receive a second set control signal SET2. The 14th NMOS transistor NM14 may have drain and source terminals coupled between the ground voltage terminal VSS and a common node between the 12th and 13th NMOS transistors NM12 and NM13. The 14th NMOS transistor NM14 may have a gate terminal coupled to the data sensing node DSO.

Through such a configuration, the current control circuit 332 may perform the set operation on the latch driving circuit 331 on the basis of the second set control signal SET2, and perform the reset operation on the latch driving circuit 331 on the basis of the second reset control signal RST2. The second reset control signal RST2 may be activated during the data sensing operation. Thus, the current control circuit 332 may control the driving current of the latch driving circuit 331 on the basis of the data transferred to the data sensing node DSO. Therefore, the latch driving circuit 331 may store the data transferred to the data sensing node DSO, on the basis of the driving current controlled by the current control circuit 332.

In short, the second latch circuit 330 including the latch driving circuit 331 and the current control circuit 332 may sense the data transferred to the data sensing node DSO and store the sensed data, during the data sensing operation. More specifically, the second latch circuit 330 may sense the data transferred to the data sensing node DSO, on the basis of the second trip voltage V_TRIP2, and store the sensing result. The voltage level of the second trip voltage V_TRIP2 may be set according to the process design of the 12th and 14th NMOS transistors NM12 and NM14 included in the current control circuit 332. Although not illustrated in the drawings, the voltage level of the second trip voltage V_TRIP2 may be variously and selectively set through additional various circuit configurations.

In this connection, the latch driving circuit 321 of the first latch circuit 320 and the second latch circuit 330 may be implemented through the same process design. When circuits are implemented through the same process design, it may indicate that the components of the respective circuits have the same circuit operation characteristics. As described above, the first trip voltage V_TRIP1 may be set by the current control circuit 322 of the first latch circuit 320, and the second trip voltage V_TRIP2 may be set by the current control circuit 332 of the second latch circuit 330. Therefore, although the latch driving circuit 321 of the first latch circuit 320 and the second latch circuit 330 have the same circuit operation characteristic, the first latch circuit 320 may apply the first trip voltage V_TRIP1, and the second latch circuit 330 may apply the second trip voltage V_TRIP2.

As a result, during the data sensing operation, the first latch circuit 320 may sense the data transferred to the common sensing node CSO, on the basis of the first trip voltage V_TRIP1. Then, during the data sensing operation, the second latch circuit 330 may sense the data transferred to the data sensing node DSO, on the basis of the second trip voltage V_TRIP2.

The first page buffer circuit 210_1 in accordance with the present embodiment may simultaneously perform the respective data sensing operations on the common sensing node CSO and the data sensing node DSO. Therefore, the first page buffer circuit 210_1 may minimize or reduce the data sensing operation, and thus minimize the read and verify operation time.

Figure 5:
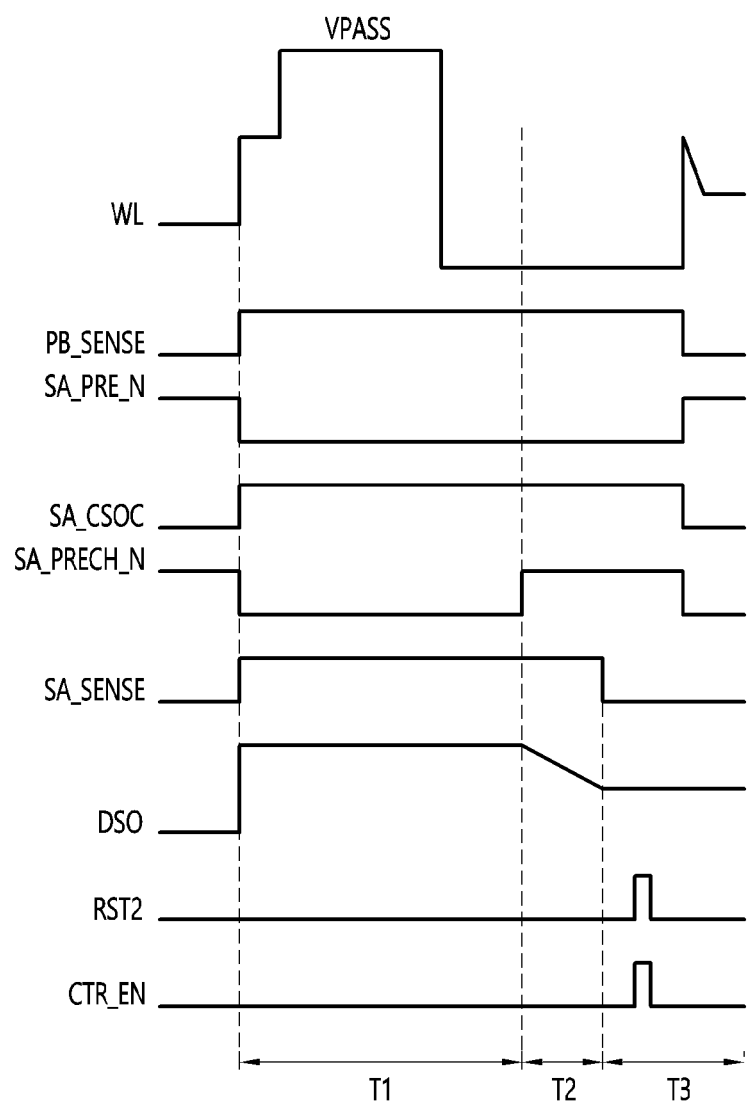
FIG. 5 is a timing diagram for describing a circuit operation of the first page buffer circuit of FIG. 3.

FIG. 5 is a timing diagram for describing the circuit operation of the first page buffer circuit 210_1 of FIG. 3. FIG. 5 illustrates a selected word line WL, the buffer sensing control signal PB_SENSE, the first precharge signal SA_PRE_N, the current control signal SA_CSOC, the second precharge signal SA_PRECH_N, the transfer control signal SA_SENSE, the data sensing node DSO, the second reset control signal RST2, and the enable control signal CTR_EN.

Referring to FIGS. 3 to 5, the selected word line WL may receive a read pass voltage VPASS during the precharging operation period T1. The first NMOS transistor NM1 may be turned on based on the buffer sensing control signal PB_SENSE. The first PMOS transistor PM1 may be turned on based on the first precharge signal SA_PRE_N. The second NMOS transistor NM2 may be turned on based on the current control signal SA_CSOC. The second PMOS transistor PM2 may be turned on based on the second precharge signal SA_PRECH_N. The third NMOS transistor NM3 may be turned on based on the transfer control signal SA_SENSE.

In other words, the power supply voltage terminal VCORE may be electrically coupled to the data sensing node DSO and precharged with the voltage level corresponding to the power supply voltage terminal VCORE, in the precharging operation period T1. As described with reference to FIG. 4, the common sensing node CSO may also be precharged in the precharging operation period T1, like the data sensing node DSO.

Then, in the evaluation operation period T2, the second PMOS transistor PM2 may be turned off based on the second precharge signal SA_PRECH_N. Therefore, the voltage level of the data sensing node DSO may be lowered according to the state of data programmed in a memory cell. As described with reference to FIG. 4, the voltage level of the common sensing node CSO may also be lowered according to the state of the data programmed in the memory cell in the evaluation operation period T2, like the data sensing node DSO. When the evaluation operation is completed, the third NMOS transistor NM3 may be turned off based on the transfer control signal SA_SENSE.

Then, in the data latching operation period T3, the second reset control signal RST2 and the enable control signal CTR_EN may be activated. When the second reset control signal RST2 is activated, the data transferred to the data sensing node DSO may be stored in the second latch circuit 330. Furthermore, when the enable control signal CTR_EN is activated, the data transferred to the common sensing node CSO may be stored in the first latch circuit 320. The active periods of the second reset control signal RST2 and the enable control signal CTR_EN may overlap each other. In other words, the data latching operation of the first latch circuit 320 and the data latching operation of the second latch circuit 330 may be performed at the same time.

As described above, the first latch circuit 320 may sense data on the basis of the first trip voltage V_TRIP1, and the second latch circuit 330 may sense data on the basis of the second trip voltage V_TRIP2. Therefore, the first page buffer circuit 210_1 in accordance with the present embodiment may acquire a more accurate data sensing operation result through one data latching operation.

In FIG. 5, the case in which the enable control signal CTR_EN is activated in the data latching operation period T3 is taken as an example. The point in time when the enable control signal CTR_EN is activated is not limited thereto. In other words, the enable control signal CTR_EN may be activated in other periods including the evaluation operation period T2. Furthermore, the point in time that the enable control signal CTR_EN is deactivated may be earlier than the point of time that the second reset control signal RST2 is activated. Therefore, the first latch circuit 320 may sense data transferred to the common sensing node CSO and store the sensed data, before the second latch circuit 330 senses data transferred to the data sensing node DSO and stores the sensed data. Furthermore, the point in time when the enable control signal CTR_EN is deactivated may be later than the point in time when the second reset control signal RST2 is deactivated.

The first page buffer circuit 210_1 in accordance with the present embodiment may sense the data transferred to the common sensing node CSO and the data sensing node DSO on the basis of the first and second trip voltages V_TRIP1 and V_TRIP2 which are different from each other, respectively, during one data sensing operation. Therefore, the first page buffer circuit 210_1 may minimize or reduce the data sensing operation.

Figure 6:
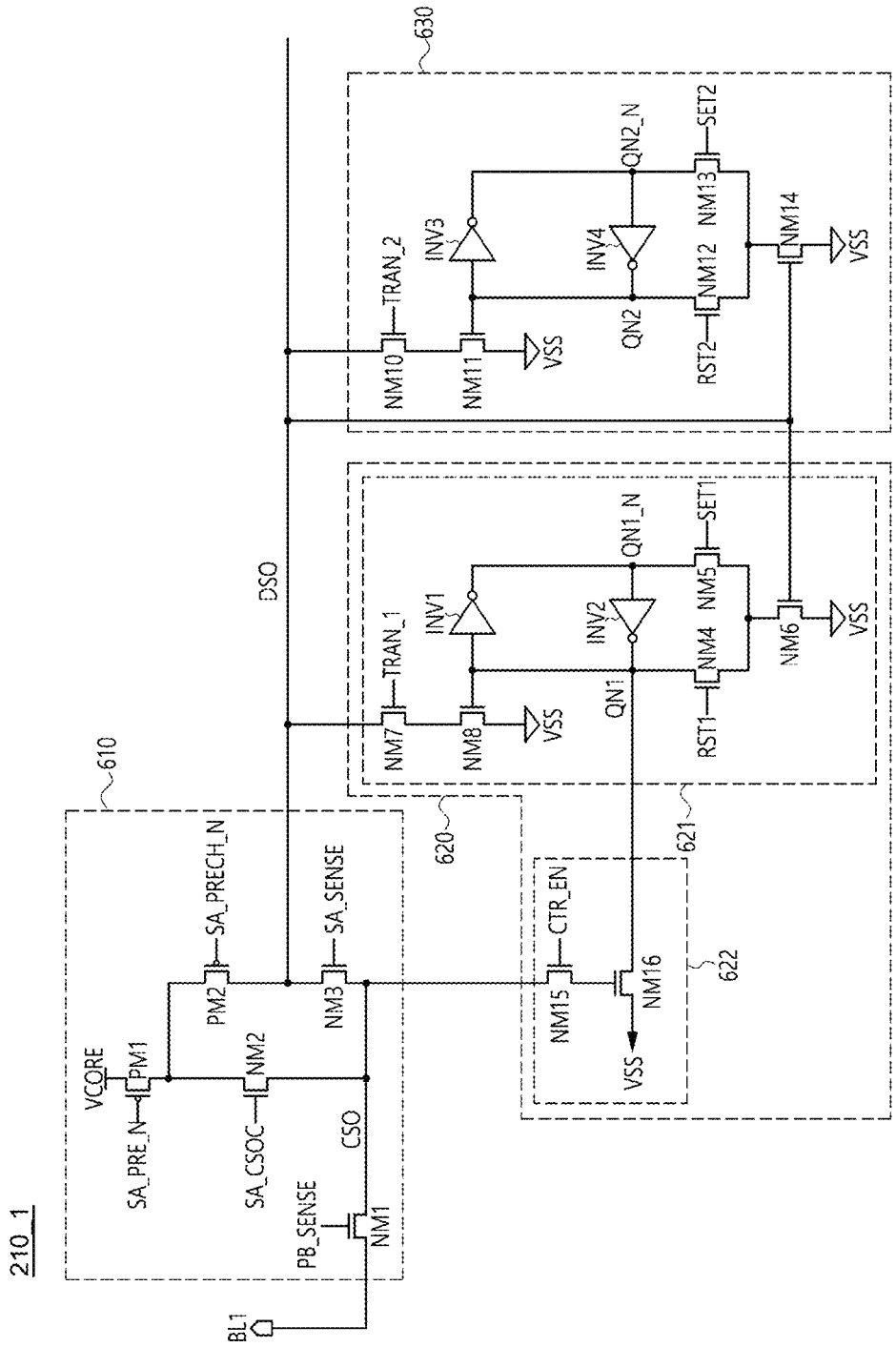
FIG. 6 is a circuit diagram schematically illustrating some components in accordance with an embodiment of the first page buffer circuit of FIG. 2.

FIG. 6 is a circuit diagram schematically illustrating some components in accordance with an embodiment of the first page buffer circuit 210_1 of FIG. 2.

Referring to FIG. 6, the first page buffer circuit 210_1 may include a data transfer circuit 610, a first latch circuit 620, and a second latch circuit 630. The configuration of FIG. 6 is different from the configuration of FIG. 3 in terms of the configuration of the first latch circuit 620. More specifically, the first latch circuit 620 of FIG. 6 may include a latch driving circuit 621 and a current control circuit 622. The latch driving circuit 621 of FIG. 6 may correspond to the latch driving circuit 321 of FIG. 3. Hereafter, for convenience of description, the current control circuit 622 will be described.

The current control circuit 622 may be configured to control the driving current of the latch driving circuit 621 on the basis of the data transferred to the common sensing node CSO. The current control circuit 622 may include 15th and 16th NMOS transistors NM15 to NM16.

The 15th NMOS transistor NM15 may have source and drain terminals coupled between the common sensing node CSO and the 16th NMOS transistor NM16. The 15th NMOS transistor NM15 may have a gate terminal configured to receive the enable control signal CTR_EN. In other words, the 15th NMOS transistor NM15 may receive the enable control signal CTR_EN through its gate terminal, and have one side coupled to the common sensing node CSO. The 16th NMOS transistor NM16 may have drain and source terminals coupled between the first primary data node QN1 and the ground voltage terminal VSS. The 16th NMOS transistor NM16 may have a gate terminal coupled to the 15th NMOS transistor NM15. In other words, the 16th NMOS transistor NM16 may have its gate terminal coupled to the other side of the 15th NMOS transistor NM15, and may be coupled between the first primary data node QN1 and the ground voltage terminal VSS.

Through such a configuration, the current control circuit 622 may control the driving current of the latch driving circuit 621 on the basis of the data transferred to the common sensing node CSO. In other words, when the enable control signal CTR_EN is activated after the data is transferred to the common sensing node CSO, the first primary data node QN1 and the ground voltage terminal VSS may be electrically coupled to each other according to the voltage level of the common sensing node CSO. Therefore, the current control circuit 622 may control the driving current of the first primary data node QN1 on the basis of the data applied to the common sensing node CSO. Therefore, the latch driving circuit 621 may store the data transferred to the common sensing node CSO, on the basis of the driving current controlled by the current control circuit 622.

In short, the first latch circuit 620 may sense the data transferred to the common sensing node CSO on the basis of the first trip voltage V_TRIP1 and store the sensing result, during the data sensing operation. The voltage level of the first trip voltage V_TRIP1 may be set according to the process design of the 15th and 16th NMOS transistors NM15 and NM16 included in the current control circuit 622. Although not illustrated in the drawings, the voltage level of the first trip voltage V_TRIP1 may be variously and selectively set through additional various circuit configurations.

As a result, during the data sensing operation, the first latch circuit 620 may sense the data transferred to the common sensing node CSO, on the basis of the first trip voltage V_TRIP1. Then, during the data sensing operation, the second latch circuit 630 may sense the data transferred to the data sensing node DSO, on the basis of the second trip voltage V_TRIP2.

Figure 7:
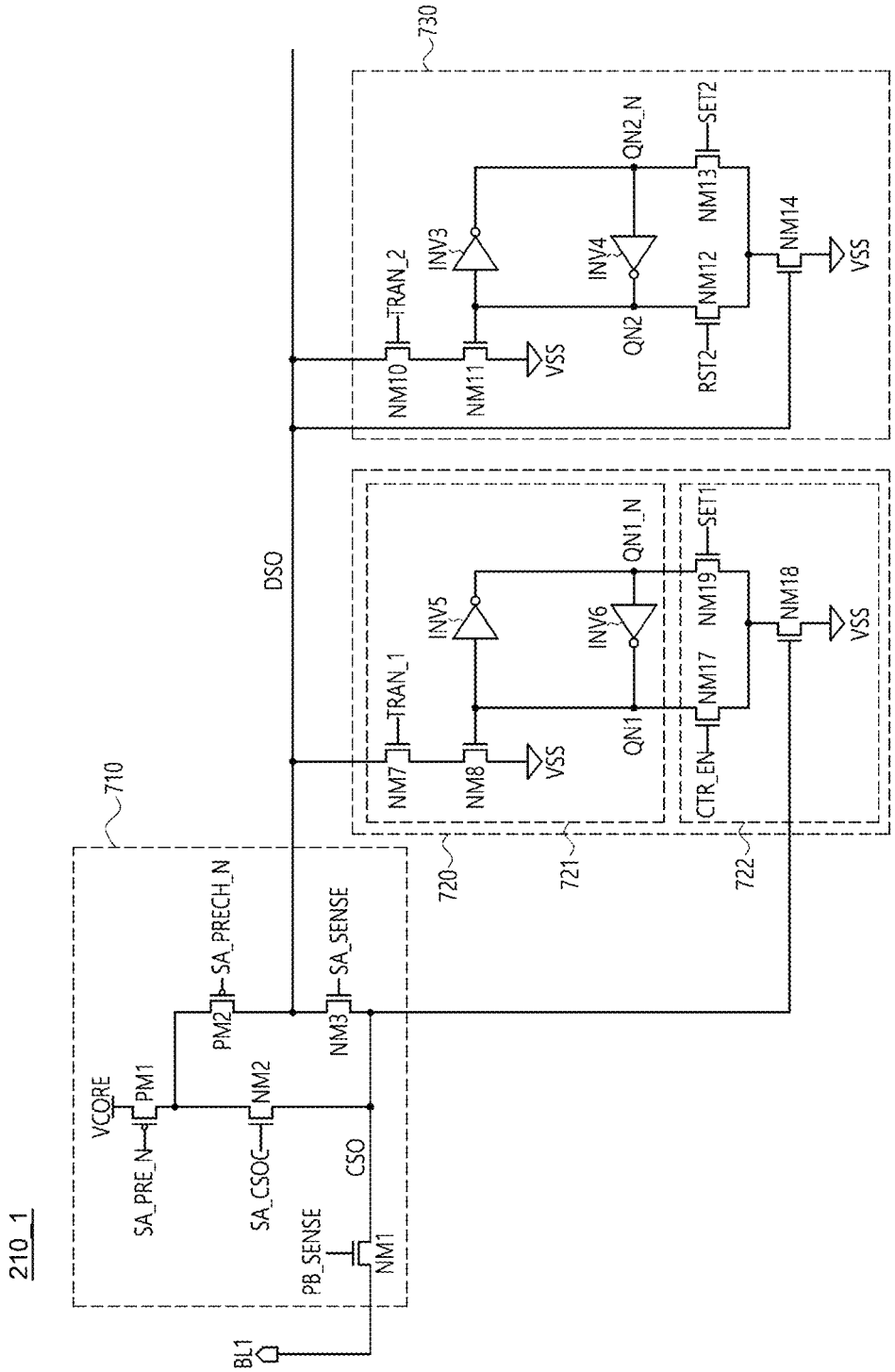
FIG. 7 is a circuit diagram illustrating some components in accordance with an embodiment of the first page buffer circuit of FIG. 2.

FIG. 7 is a circuit diagram illustrating some components in accordance with an embodiment of the first page buffer circuit 210_1 of FIG. 2.

Referring to FIG. 7, the first page buffer circuit 210_1 may include a data transfer circuit 710, a first latch circuit 720, and a second latch circuit 730. The configuration of FIG. 7 is different from the configuration of FIG. 3 in terms of the configuration of the first latch circuit 720. More specifically, the first latch circuit 720 of FIG. 7 may include a latch driving circuit 721 and a current control circuit 722. The latch driving circuit 721 of FIG. 7 may correspond to the latch driving circuit 321 of FIG. 3. Hereafter, for convenience of description, the current control circuit 722 will be described.

The current control circuit 722 may be configured to control the drivability of the latch driving circuit 721 on the basis of the data transferred to the common sensing node CSO. The current control circuit 722 may include 17th and 18th NMOS transistors NM17 and NM18.

The 17th NMOS transistor NM17 may have drain and source terminals coupled between the first primary data node QN1 and the 18th NMOS transistor NM18. The 17th NMOS transistor NM17 may have a gate terminal configured to receive the enable control signal CTR_EN. In other words, the 17th NMOS transistor NM17 may receive the enable control signal CTR_EN through its gate terminal, and have one side coupled to the first primary data node QN1. The 18th NMOS transistor NM18 may have drain and source terminals coupled between the 17th NMOS transistor NM17 and the ground voltage terminal VSS. The 18th NMOS transistor NM18 may have a gate terminal coupled to the common sensing node CSO. In other words, the 18th NMOS transistor NM18 may have its gate terminal coupled to the common sensing node CSO, and may be coupled between the 17th NMOS transistor NM17 and the ground voltage terminal VSS.

Through such a configuration, the current control circuit 722 may control the driving current of the latch driving circuit 721, on the basis of the data transferred to the common sensing node CSO. Furthermore, the latch driving circuit 721 may store the data transferred to the common sensing node CSO, on the basis of the driving current controlled by the current control circuit 722. As a result, the first latch circuit 720 may sense the data transferred to the common sensing node CSO, on the basis of the first trip voltage V_TRIP1 and store the sensing result, during the data sensing operation. The voltage level of the first trip voltage V_TRIP1 may be set according to the process design of the 17th and 18th NMOS transistors NM17 and NM18 included in the current control circuit 722. Furthermore, the voltage level of the first trip voltage V_TRIP1 may be set according to the process design of the fifth and sixth inverters INV5 and INV6.

In the architecture of FIG. 7, the 17th NMOS transistor NM17 may perform a reset operation of the latch driving circuit 721. Therefore, the enable control signal CTR_EN for controlling the 17th NMOS transistor NM17 may be activated during the reset operation.

As a result, during the data sensing operation, the first latch circuit 720 may sense the data transferred to the common sensing node CSO, on the basis of the first trip voltage V_TRIP1. Furthermore, during the data sensing operation, the second latch circuit 730 may sense the data transferred to the data sensing node DSO, on the basis of the second trip voltage V_TRIP2.

Figure 8:
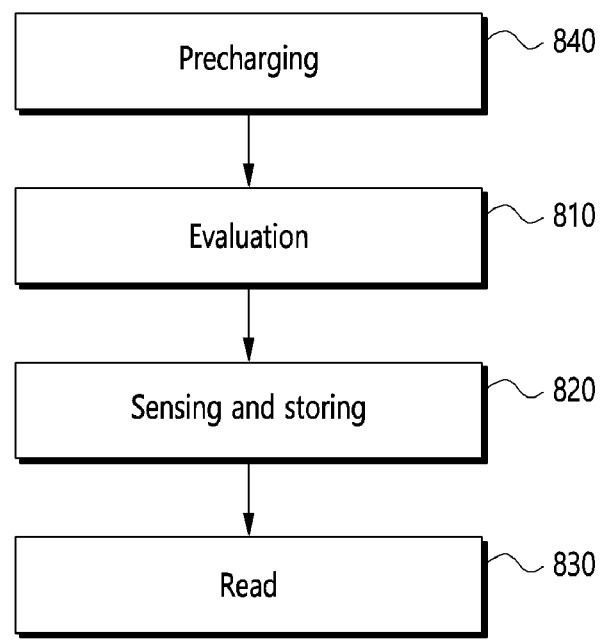
FIG. 8 is a diagram for describing an operation method of the first page buffer circuit of FIG. 3.

FIG. 8 is a flowchart for describing an operation method of the first page buffer circuit 210_1 of FIG. 3.

Referring to FIGS. 3 and 8, the operation method of the first page buffer circuit 210_1 may include an evaluation step 810, a sensing and storing step 820, and a read step 830.

The evaluation step 810 may include evaluating a plurality of sensing nodes on the basis of data transferred during a data sensing operation. In other words, the evaluation step 810 may include evaluating the common sensing node CSO and the data sensing 5 node DSO on the basis of data transferred through the first bit line BL1. The evaluation step 810 may be performed by the data transfer circuit 310 of FIG. 3. As described above, the data transfer circuit 310 may transfer data to the common sensing node CSO and the data sensing node DSO in the evaluation operation period T2 (see FIGS. 4 and 5). Thus, the common sensing node CSO and the data sensing node DSO may each have a voltage level corresponding to the data.

The sensing and storing step 820 may include sensing the plurality of sensing nodes and storing the sensing results. In other words, the sensing and storing step 820 may include sensing the common sensing node CSO and the data sensing node DSO on the basis of the data, and storing the sensing results. The sensing and storing step 820 may be performed by the first and second latch circuits 320 and 330 of FIG. 3. As described above, the first and second latch circuits 320 and 330 may sense the common sensing node CSO and the data sensing node DSO and store the sensing results, in the data latching operation period T3 (see FIG. 5). More specifically, the first latch circuit 320 may sense the data transferred to the common sensing node CSO, on the basis of the first trip voltage V_TRIP1, and store the sensing result. Furthermore, the second latch circuit 330 may sense the data transferred to the data sensing node DSO, on the basis of the second trip voltage V_TRIP2, and store the sensing result.

The read step 830 may include reading the results of the sensing and storing step 820. The read step 830 may include performing a read operation on the basis of the data stored in the first and second latch circuits 320 and 330. The read step 830 may include a verify operation. In other words, during the verify operation, data stored in a selected memory cell may be sensed and latched by the first page buffer circuit 210_1. Therefore, the first page buffer circuit 210_1 in accordance with the present embodiment may sense the data transferred to the common sensing node CSO, on the basis of the first trip voltage V_TRIP1 and store the sensed data, during the verify operation. Furthermore, the first page buffer circuit 210_1 may sense the data transferred to the data sensing node DSO, on the basis of the second trip voltage V_TRIP2 and store the sensed data, during the verify operation.

The operation method of the first page buffer circuit 210_1 may include a precharging step 840.

The precharging step 840 may be performed before the evaluation step 810. The precharging step 840 may include precharging the plurality of sensing nodes to which data are transferred during the data sensing operation. In other words, the precharging step 840 may include precharging the common sensing node CSO and the data sensing node DSO to which the data are transferred from the first bit line BL1. The precharging step 840 may be performed by the data transfer circuit 310 of FIG. 3. As described above, the data transfer circuit 310 may precharge the common sensing node CSO and the data sensing node DSO in the precharging operation period T1 (see FIGS. 4 and 5).

The first page buffer circuit 210_1 in accordance with the present embodiment may sense the common sensing node CSO and the data sensing node DSO, which are the plurality of sensing nodes, on the basis of the first and second trip voltages V_TRIP1 and V_TRIP2, respectively, which are different from each other, and store the sensing results, during the data sensing operation. Therefore, the first page buffer circuit 210_1 may minimize or reduce the data sensing operation, and thus minimize the read and verify operation time.

While various embodiments have been described above, it will be understood by those skilled in the art that the embodiments described are examples only. Accordingly, the page buffer circuit and the operation method, which are described herein, should not be limited based on the described embodiments.

What is claimed is:

1. A page buffer circuit comprising:
   a data transfer circuit configured to transfer data, received through a bit line, to a first sensing node and to a second sensing node during a data sensing operation;
   a first latch circuit configured to sense the data transferred to the first sensing node, and store the sensed data transferred to the first sensing node; and
   a second latch circuit configured to sense the data transferred to the second sensing node, and store the sensed data transferred to the second sensing node,
   wherein the first latch circuit comprises:
   a latch driving circuit coupled to the second sensing node and configured to store the data transferred to the first sensing node in a data node and discharge the second sensing node based on the data node; and
   a current control circuit coupled to the data node and the first sensing node and configured to control a driving current of the data node on the basis of the data transferred to the first sensing node.

2. The page buffer circuit according to claim 1, wherein:
   the first latch circuit senses the data transferred to the first sensing node, on the basis of a first trip voltage, and
   the second latch circuit senses the data transferred to the second sensing node, on the basis of a second trip voltage.

3. The page buffer circuit according to claim 2, wherein the second trip voltage is higher than the first trip voltage.

4. The page buffer circuit according to claim 1, wherein the latch driving circuit and the second latch circuit have the same structure.

5. The page buffer circuit according to claim 1, wherein the current control circuit controls the driving current on the basis of an enable control signal which is activated during the data sensing operation.

6. The page buffer circuit according to claim 5, wherein the current control circuit comprises:
   a first transistor having a gate terminal coupled to the first sensing node and one side coupled to the data node of the latch driving circuit; and
   a second transistor configured to receive the enable control signal through its gate terminal, the second transistor being coupled between the other side of the first transistor and a power supply voltage terminal.

7. The page buffer circuit according to claim 5, wherein the current control circuit comprises:
   a first transistor configured to receive the enable control signal through its gate terminal, the first transistor having one side coupled to the first sensing node; and a second transistor coupled between the data node of the latch driving circuit and a power supply voltage terminal, the second transistor having a gate terminal coupled to the other side of the first transistor.

8. The page buffer circuit according to claim 5, wherein the current control circuit comprises:
a first transistor having a gate terminal configured to receive the enable control signal which is activated during a reset operation, and having one side coupled to the data node of the latch driving circuit; and
a second transistor coupled between the first transistor and a power supply voltage terminal, and having a gate terminal coupled to the first sensing node.

9. The page buffer circuit according to claim 5, wherein the enable control signal is activated in periods including an evaluation operation period.

10. The page buffer circuit according to claim 1, wherein the second latch circuit comprises:
a latch driving circuit configured to store the data transferred to the second sensing node; and
a current control circuit configured to control a driving current of the latch driving circuit on the basis of the data transferred to the second sensing node.

11. An operation method of a page buffer circuit, the method comprising:
evaluating a plurality of sensing nodes on the basis of data transferred during a data sensing operation;
sensing the plurality of sensing nodes, and storing sensing results; and
reading the sensing results,
wherein the sensing the plurality of sensing nodes and the storing the sensing results comprises:
a first storing operation of sensing a first sensing node of the plurality of sensing nodes and storing a sensing result of the first sensing node; and
a second storing operation of sensing a second sensing node of the plurality of sensing nodes and storing a sensing result of the second sensing node, and
wherein the first and second storing operations have active periods overlapping each other.

12. The operation method according to claim 11, wherein sensing the plurality of sensing nodes and storing the sensing results comprises sensing the plurality of sensing nodes with different trip voltages, respectively, during the data sensing operation.

13. The operation method according to claim 11,
wherein sensing the first sensing node is performed on the basis of a first trip voltage, and
sensing the second sensing node is performed on the basis of a second trip voltage different from the first trip voltage.

14. The operation method according to claim 11, wherein reading the sensing results comprises a verify operation.

15. An operation method of a page buffer circuit, the method further comprising:
precharging a first sensing node and precharging a second sensing node with a higher voltage level than the first sensing node;
evaluating the first sensing node and the second sensing node on the basis of data transferred during a data sensing operation; and
sensing the first sensing node and the second sensing node.

16. The operation method according to claim 15,
wherein sensing the first sensing node and the second sensing node comprises:
a first storing operation of sensing the first sensing node on the basis of a first trip voltage, and storing a result of sensing the first sensing node; and
a second storing operation of sensing the second sensing node on the basis of a second trip voltage higher than the first trip voltage, and storing a result of sensing the second sensing node.

17. The operation method according to claim 16, wherein the first storing operation is activated while evaluating the first sensing node and the second sensing node.

18. The operation method according to claim 16, wherein the first storing operation is deactivated before the second storing operation is activated.

* * * * *